United States Patent
Wang et al.

(10) Patent No.: US 9,824,615 B2
(45) Date of Patent: Nov. 21, 2017

(54) LOAD ADAPTIVE POWER MANAGEMENT FOR A DISPLAY PANEL

(71) Applicant: Apple Inc., Cupertino, CA (US)

(72) Inventors: Chaohao Wang, Cupertino, CA (US); Wonjae Choi, Cupertino, CA (US); Sandro H. Pintz, Menlo Park, CA (US); Paolo Sacchetto, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 205 days.

(21) Appl. No.: 14/732,764

(22) Filed: Jun. 7, 2015

(65) Prior Publication Data
US 2016/0358526 A1    Dec. 8, 2016

(51) Int. Cl.
*G09G 5/00* (2006.01)
*G09G 3/20* (2006.01)
*G09G 3/3208* (2016.01)
*G06F 1/32* (2006.01)
*G09G 3/36* (2006.01)

(52) U.S. Cl.
CPC ............ *G09G 3/20* (2013.01); *G09G 3/3208* (2013.01); *G06F 1/3234* (2013.01); *G06F 1/3265* (2013.01); *G09G 3/3614* (2013.01); *G09G 2330/021* (2013.01); *G09G 2330/022* (2013.01); *G09G 2360/08* (2013.01); *G09G 2360/16* (2013.01); *G09G 2360/18* (2013.01); *Y02B 70/16* (2013.01)

(58) Field of Classification Search
CPC .......... H02M 3/1582; H02M 2001/009; G09G 2330/021; G06F 1/3265; G06F 1/3234; Y02B 70/16

USPC ......................................................... 345/212
See application file for complete search history.

(56) References Cited

U.S. PATENT DOCUMENTS

| | | | |
|---|---|---|---|
| 7,893,933 B2* | 2/2011 | Yi ........................ | G09G 3/3611 345/204 |
| 2006/0101295 A1* | 5/2006 | Park ........................ | G06F 1/26 713/300 |
| 2006/0119553 A1* | 6/2006 | Akima .................. | G09G 3/2014 345/77 |
| 2008/0007236 A1* | 1/2008 | Elbanhawy ........... | H02M 3/157 323/283 |
| 2008/0068328 A1* | 3/2008 | Jou ....................... | G09G 3/3406 345/102 |
| 2008/0204475 A1* | 8/2008 | Kim ....................... | G06F 1/3218 345/660 |
| 2009/0001949 A1* | 1/2009 | Komori ............... | H02M 3/1584 323/272 |

(Continued)

*Primary Examiner* — Yuzhen Shen
(74) *Attorney, Agent, or Firm* — McDermott Will & Emery LLP (57) ABSTRACT

This application relates to systems, methods, and apparatus for optimizing the operations of a power converter of a display panel based on image data to be output by the display panel. The power converter can include one or more switches that can be activated or deactivated based on the image data in order to shift a power efficiency of the power converter. Power efficiency is shifted as a result of balancing an amount of charge necessary for a load with an amount of resistance created when activating switches of the power converter. Therefore, by dynamically altering a configuration of a power converter based on image data, power efficiency of the power converter can be improved.

17 Claims, 10 Drawing Sheets

(56) References Cited

U.S. PATENT DOCUMENTS

| | | | |
|---|---|---|---|
| 2009/0243986 A1* | 10/2009 | Jung | G09G 3/3406 345/94 |
| 2010/0171749 A1* | 7/2010 | Chen | G09G 3/3648 345/547 |
| 2011/0050754 A1* | 3/2011 | Hyun | G09G 3/20 345/690 |
| 2016/0078830 A1* | 3/2016 | Huang | G09G 3/3406 345/691 |

* cited by examiner

LOAD ADAPTIVE POWER MANAGEMENT FOR A DISPLAY PANEL

FIELD

The described embodiments relate generally to power management devices for display panels. More particularly, the present embodiments relate to power management devices that can reconfigure based on image data to be output by a display panel. In this way, the power efficiency of the power management device can be adaptively improved based on image data.

BACKGROUND

Power efficiency of computing devices has improved in recent times as many devices incorporate smaller components that require less power. However, in computing devices that incorporate display panels, power efficiency has become a growing problem as display panels become more densely packed with various display components. Although certain systems exist for reducing power consumption of display devices, many of these systems fall short of effectively improving power efficiency while still maintaining a quality user experience. As a result, hardware designers often must choose between a more efficient power scheme or a higher quality display output. Unfortunately, if either of these choices are not adequately managed, the user experience can be severely inhibited.

SUMMARY

This paper describes various embodiments that relate to systems, methods, and apparatus for adaptively reconfiguring a power management device of a display panel based on image data to be output by the display panel. In some embodiments, a method is set forth for operating a power management device to improve power efficiency of a display panel connected to the power management device. The method can include a step of receiving a command signal associated with an expected load of the power management device. The expected load can be based in part on image data to be output by the display panel. The method can further include a step of reconfiguring a switch arrangement of the power management device according to the command signal in order to shift a power efficiency of the power management device based on the image data.

In other embodiments, a display controller is set forth. The display controller can include an input configured to receive image data for display at a display panel. The display controller can be configured to compare a current load associated with previous image data to an expected load associated with the received image data and determine a load difference based on the comparison. The display controller can further include an output configured to send a command signal to a power converter to cause the power converter to (i) reconfigure a switch arrangement of the power converter and (ii) provide power to the display panel based on the load difference. The display panel can be a liquid crystal display (LCD) or an organic light emitting diode (OLED) display panel.

In yet other embodiments, a computing device is set forth. The computing device can include a display panel configured to output image data provided by a graphics processor of the computing device. The computing device can further include a display controller configured to generate a command signal based on the image data. The command signal can be based on a load difference between the image data and previously output image data. Additionally, the computing device can include a power converter configured to provide power to the display panel at least based on the command signal. A circuit configuration of the power converter can dynamically adjust according to whether the load difference between the image data and the previously output image data is increasing or decreasing.

Other aspects and advantages of the invention will become apparent from the following detailed description taken in conjunction with the accompanying drawings which illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting. In this way, other embodiments may be used, and changes may be made without departing from the spirit and scope of the described embodiments.

Power efficiency of computing devices has been an increasing issue as many computing device take on various different responsibilities. In computing devices incorporating display panels, often times the display panel can be a substantial consumer of electricity. Unfortunately, the task of improving power efficiency for a display panel has many facets that involve careful attention as the display panel can be the primary interface between a user and the computing device. Therefore, diminishing the quality of output from the display panel can drastically affect the user experience. For example, some computing devices incorporate power converters for providing a supply of charge for each display line of a display panel. If the supply of charge is reduced during operation, certain display artifacts can be exhibited by the display panel. Furthermore, if too much charge is provided to the display panel then the power efficiency of the power converter will be reduced. However, as discussed herein, the power efficiency of a power converter can be dynamically shifted based on image data in order to improve the efficiency of the power converter during operation of the display panel.

A power converter can be embodied in a power management integrated circuit (PMIC) that can be connected to a display driver of the display panel. The power converter can include a switching arrangement that determines the power output of the power converter based on the number of switches that are actively toggling or not actively toggling. For example, the power converter can be a switching regulator that includes multiple switches connected to one or more interconnected inductors and capacitors. The power converter can also be a switched-capacitor regulator that includes multiple switches and capacitors that charge and discharge according to the toggling of the switches. In order to shift the efficiency of the power converter, the number of switches that are actively toggling during operation can be increased and/or decreased for a given load. The load can refer to an expected load for the display panel to which the power converter is providing power. During operation of the display panel, image data will be output from various pixels of the display panel using at least voltage or current provided by the power converter. Therefore, the load of the display panel will vary based on the image data that is to be output by the display panel. If the image data corresponds to an image that is brighter than previously output image data, then the power converter can increase the amount of voltage or current that the power converter is providing to the display panel or display driver. If the image data corresponds to an image that is less bright than previously output image data, then the power converter can decrease the amount of voltage or current that the power converter is providing to the display panel or display driver. As discussed herein, the power converter can increase or decrease the amount of voltage or current output from the power converter by increasing or decreasing the number of switches in the power converter that are actively toggling.

The PMIC can be connected to a display controller or a timing controller. The display controller can continually and periodically receive image data from a graphics processing unit (GPU) of a computing device and perform various calculations using the image data that is received. Based on these calculations, the display controller can determine differences between image data that is output by the display panel. For example, the display controller can determine differences and/or a sum of differences between pixel data, line data, and/or frame data, and provide a command signal to the PMIC based on those differences. Additionally, the display controller can determine an amount of luminance/brightness or average amount of luminance/brightness associated with the pixel data, line data, and/or frame data that is provided to the display controller in order to generate the command signal. In some embodiments, previously output image data can be stored in a buffer of the display controller. Thereafter, when additional or new image data is provided to the display controller, the display controller can compare the additional image data to the previously output image data. Based on this comparison, the display controller can determine a dynamic power adjustment for the power converter to operate efficiently. The dynamic power adjustment can be generated on a per frame basis, a per line basis, and/or a per pixel basis.

The command signal generated by the display controller can be provided to the PMIC in order for the PMIC to reconfigure a switch arrangement of the power converter based on the command signal. For example, when the power converter includes a switch regulator, the number of switches that are actively toggling to transfer current through the inductor can be increased or decreased based on the command signal. When the power converter includes a switched capacitor regulator, the number of switches and capacitors that are actively being charged can be increased or decreased based on the command signal. When the display controller includes a scalar logic, a scalar of the image data can be adjusted to compensate for the dynamic power adjustment. In this way, the image data can be modified according to the dynamic power adjustment calculated by the display controller before further processing of the image data.

When the power efficiency shifting technique described herein is embodied in a liquid crystal display (LCD) and/or an organic light emitting diode (OLED) display, the PMIC can be connected to a power supply input to a display driver of the LCD. The display driver can be at least one of a column driver, row driver, data driver, scan driver, and/or any other suitable driver for charging pixels of a display. The PMIC for the LCD and/or OLED display can also be connected to any other power supply input to the LCD and/or OLED display. For example, the PMIC can be connected to a common voltage supply of an OLED display as well as a data driver of the OLED display in order to maximum the power efficiency of the OLED display panel. In embodiments where the PMIC is connected to multiple power sources (e.g., a display driver and a common voltage supply), the display controller can be configured to provide multiple command signals to the PMIC that each corresponds to a respective power source. In this way, the display controller can determine an appropriate dynamic power adjustment for the display driver as well as an appropriate dynamic power adjustment for the common voltage supply.

These and other embodiments are discussed below with reference to FIGS. 1A-10; however, those skilled in the art will readily appreciate that the detailed description given herein with respect to these figures is for explanatory purposes only and should not be construed as limiting.

Figure 1A:
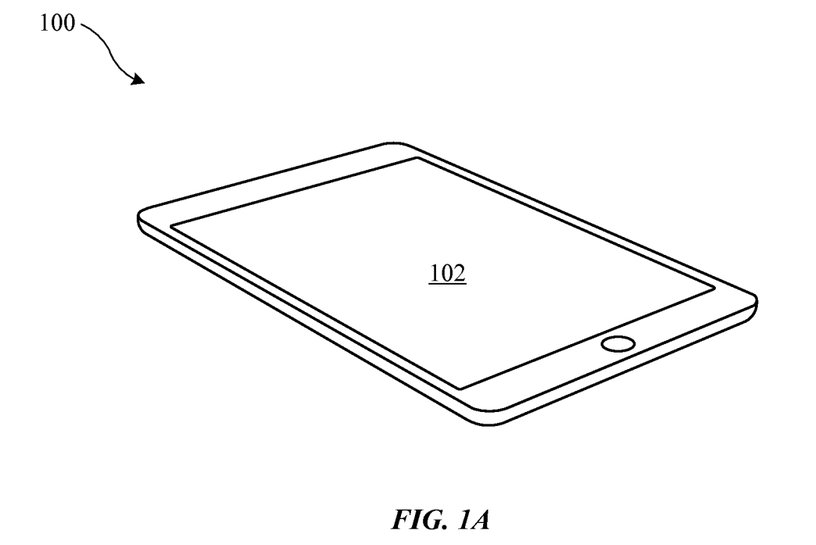
FIG. 1A illustrates a computing device that includes a display panel that can be connected to a power management integrated circuit (PMIC).

FIG. 1A illustrates a computing device 100 that includes a display panel 102 that can be connected to a power management integrated circuit (PMIC), which can reconfigure a power converter of the PMIC based on image data to be output by the display panel 102. The computing device 100 can be any electronic device suitable for connecting to a display device such as a liquid crystal display (LCD) or an organic light emitting diode (OLED) display. For example, the computing device 100 can be a laptop computer, tablet computer, media player, cellular phone, desktop computing device, wearable computing device, or any other computing device suitable for connecting to a display device.

Figure 1B:
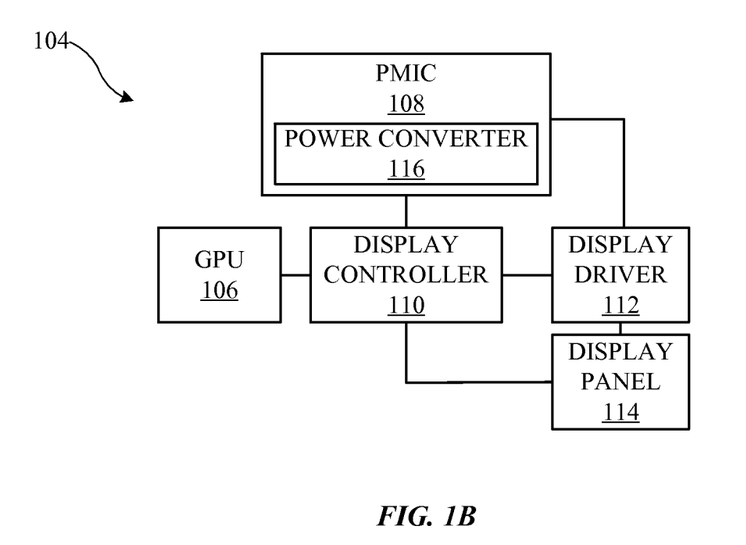
FIG. 1B illustrates a system diagram that includes a PMIC that can reconfigure a power converter of the PMIC based on image data to be output by a display panel.

FIG. 1B illustrates a system diagram 104 that includes a PMIC 108 that can reconfigure a power converter 116 connected to the PMIC 108 in order to adaptively provide power to a display driver 112 connected to a display panel 114. The display driver 112 can be a column driver, row driver, data driver, scan driver, voltage buffer, common voltage supply, or any component or module that can provide a voltage or current to a display device such as display panel 114. The display panel 114 can be an LCD, OLED display, or any other display device that can provide a display output based on image data from a graphics processing unit (GPU) 106. The GPU 106 can provide image data to a display controller 110 and, based on the image data, the display controller 110 can send a command signal to the PMIC 108. The command signal can direct the PMIC 108 to reconfigure a power converter 116 of the PMIC 108 according to a load associated with the image data. The command signal can include one or more bits corresponding to the components of the power converter 116, such that one or more of the components can be activated or deactivated based on the one or more bits. By activating or deactivating one or more components of the power converter 116, a power output to the display driver 112 can be adapted according to the changes in image data. The changes in image data can refer to frame by frame changes, line by line changes, and/or pixel by pixel changes. In this way, the PMIC 108 is able to anticipate a change in power/load for the display panel 114 based on the image data and reconfigure the power converter 116 to improve a power efficiency of the power converter 116. For example, if the image data corresponds to a brighter image than previous image data, the power converter 116 can be reconfigured by the PMIC 108 to provide more power to the display driver 112. Moreover, if the image data corresponds to a less bright image than the previous image data, the power converter 116 can be reconfigured by the PMIC 108 to provide less power to the display driver 112. In this way, because less charge will be available for less bright images, the power converter 116 will waste less charge and be more efficient.

The power converter 116 can be any suitable type of power converter 116 for providing power to a display driver 112. A source of power for the power converter 116 can be a battery or power adapter. In some embodiments, the power converter 116 is a direct current (DC) to DC power converter 116 capable of stepping up or down a voltage of a DC signal input to the power converter 116. The power converter 116 can include one or more components that can be activated and/or deactivated in order to adjust a power output of the power converter. For example, the power converter 116 can include one or more switches that can be activated or deactivated, such that the switches are able to toggle when activated and not toggle when the switches are deactivated. The switches can be connected to one or more capacitors and/or inductors as discussed herein, in order to temporarily store charge and output charge.

Figure 2A:
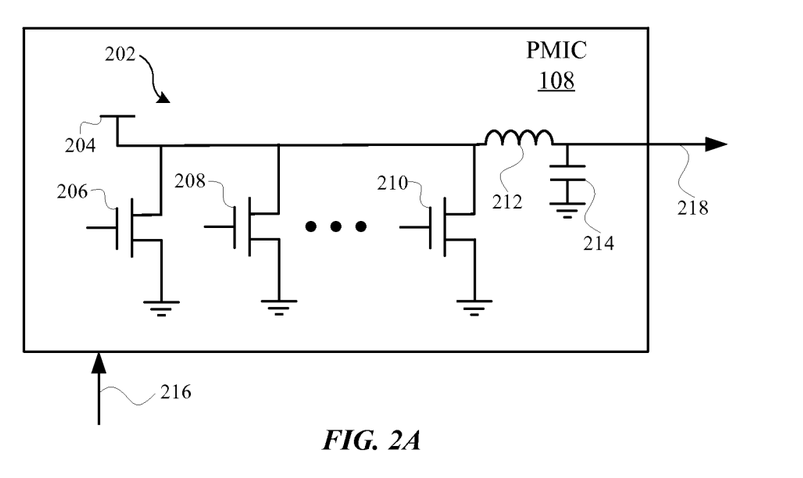
FIG. 2A illustrates a PMIC that is connected to a switch regulator.

FIG. 2A illustrates a PMIC 108 that is connected to a switch regulator 202. The switch regulator 202 operates as a power converter that can scale its output 218 according to a command signal 216 received by the PMIC 108. Scaling the switch regulator 202 refers to the ability of the switch regulator 202 to activate or deactivate one or more switches of the switch regulator 202. The switch regulator 202 can include any number of switches, not limited to switch 206, switch 208, and switch 210, as indicated by the ellipsis (" . . . "). During operation of the PMIC 108, the PMIC 108 can receive the command signal 216 and determine how many switches to activate or deactivate based on the command signal. Activating and deactivating a switch can refer to limiting the ability of a switch to toggle (i.e., turn on and off) during operation of the switch regulator 202. For example, when all switches 206-210 are active, they are able to toggle such that a supply signal 204 can be stepped down according to the toggling. The supply signal 204 is stepped down by sequentially charging and discharging one or more capacitors 214 connected to an inductor 212. The capacitor 214 can discharge when one or more of the switches 206-210 closes, thereby providing a pathway for the supply signal 204 to reach a common ground. The capacitor 214 can charge when one or more of the switches 206-210 opens, allowing the supply signal 204 to reach and charge the capacitor 214. The number of active switches can therefore affect an output 218 of the switch regulator 202 when more or less switches are directing the supply signal 204 to the common ground. Therefore, because the command signal 216 can be based on image data received by the display controller 110, the PMIC 108 is able to scale the number of activate or inactive switches of the switch regulator 202 based on image data. For example, the PMIC 108 is able to scale the number of active switches up for brighter images and down for less bright images.

Figure 2B:
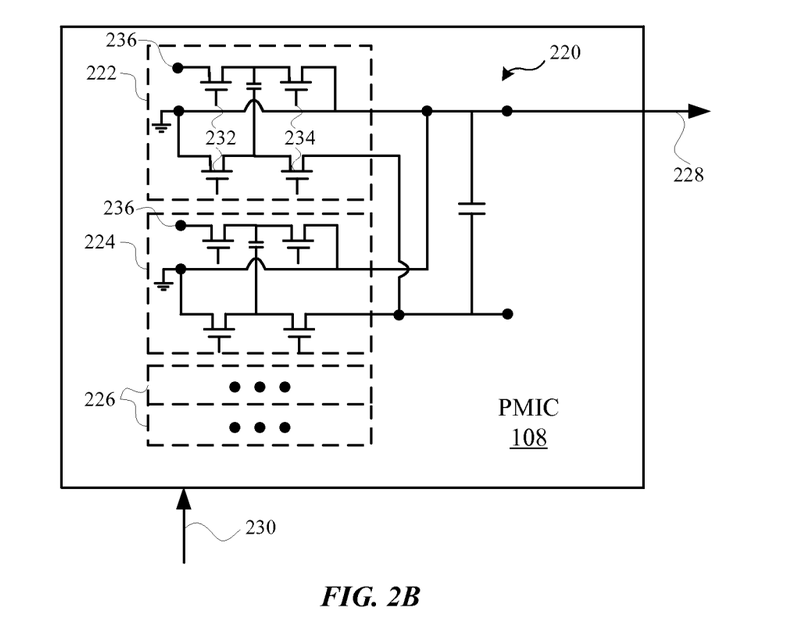
FIG. 2B illustrates a PMIC that is connected to a switched capacitor regulator (SCR).

FIG. 2B illustrates a PMIC 108 that is connected to a switched capacitor regulator (SCR) 220. The SCR 220 can operate as a power converter that can scale its output signal 228 according to a command signal 230. Scaling the SCR 220 is similar to scaling the switch regulator 202 discussed herein. For example, the SCR 220 can scale when the PMIC 108 activates or deactivates one or more charge modules of the SCR 220. The SCR 220 can include any number of charge modules, not limited to charge module 222, 224, and 226, as indicated by the ellipsis (" . . . "). During operation of the PMIC 108, the PMIC 108 can receive the command signal 230 and determine how many charge modules to activate or deactivate based on the command signal. Activating and deactivating a charge module can refer to limiting the ability of a charge module to charge and transmit charge during operation of the switch regulator 220. For example, when charge module 222 is active and receiving a supply signal 236, each of the sets of switches 232 and 234 can be toggled in an alternating fashion. In this way, a capacitor between the sets of switches 232 and 234 can be periodically charged and discharged in order to provide an output signal 228. As more or less charge modules are activated or deactivated based on the command signal 230, the amount of charge available for the output signal 228 will increase or decrease respectively. Therefore, because the command signal 230 can be based on image data received by the display controller 110, the PMIC 108 is able to scale the number of active or inactive charge modules 222-226 of the switch regulator 220 based on image data. For example, the PMIC 108 is able to scale the number of active charge modules up for brighter images and down for less bright images.

Figure 3:
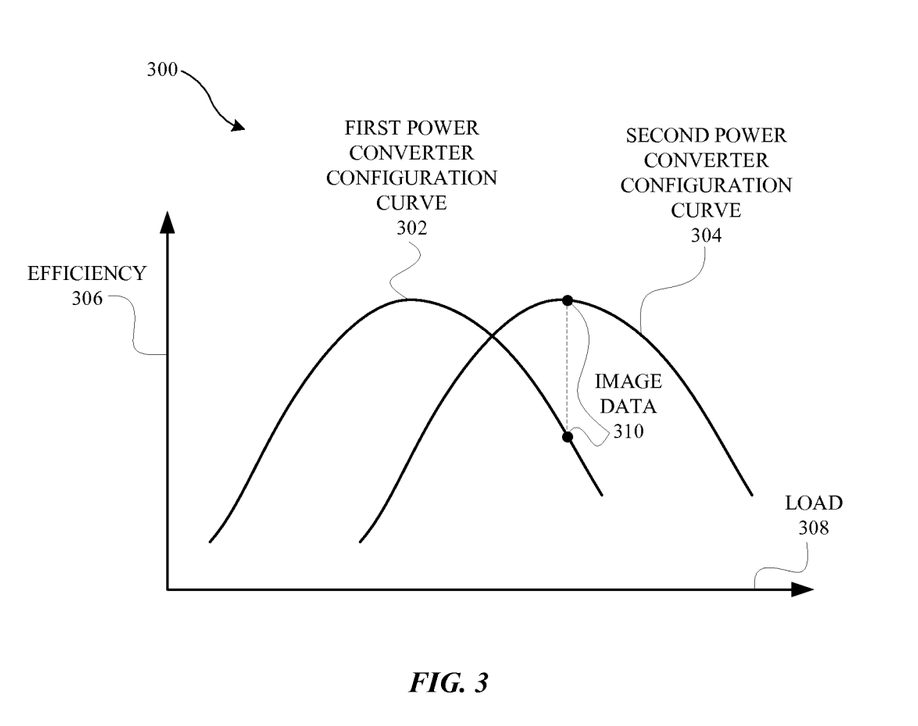
FIG. 3 illustrates a plot that provides an example of how efficiency of a power converter can be shifted based on an arrangement of the components of the power converter.

FIG. 3 illustrates a plot 300 providing an example of how efficiency of a power converter can be shifted based on an arrangement of the circuit components of the power converter, as discussed herein. The plot 300 includes axes for efficiency 306 and load 308. Efficiency 306 can refer to a power efficiency of a power converter, where greater power efficiency is more desirable to conserve power. Load 308 can refer to an amount of voltage or current consumed by the power converter, or the size of the load 308 connected to a power converter. In this way, when the power converter is connected to a display panel, the load 308 can refer to a brightness of an image being displayed at the display panel. A first power converter configuration curve 302 is illustrated in plot 300 as an initial state of any of the power converters discussed herein. The power converter corresponding to the first power converter configuration curve 302 can be reconfigured in order to optimize the efficiency 306 of the power converter for a given load 308. For example, image data 310, which can refer to any data provided by a GPU, can correspond to a single load for the power converter but different efficiencies for the power converter. If the power converter continues operating according in first configuration corresponding to the first power converter configuration curve 302, charge may be wasted in view of the second power converter configuration curve 304. Therefore, if the power converter reconfigures to operate in a second configuration corresponding to the second power converter configuration curve 304, efficiency of the power converter can be increased, as illustrated in FIG. 300. The shift of efficiency for a power converter 116 can be performed by the PMIC 108 in response to the PMIC 108 receiving a command signal from the display controller 110. The display controller 110 can direct the PMIC 108 to reconfigure the power converter 116 dynamically based on the image data received by the display controller 110 from the GPU 106. In this way, the efficiency of the power converter 116 can be shifted dynamically as the display panel 114 is displaying various different images over time. The shifting of the efficiency can be performed on a per frame basis, a per line basis, and/or a per pixel basis.

Figure 4A:
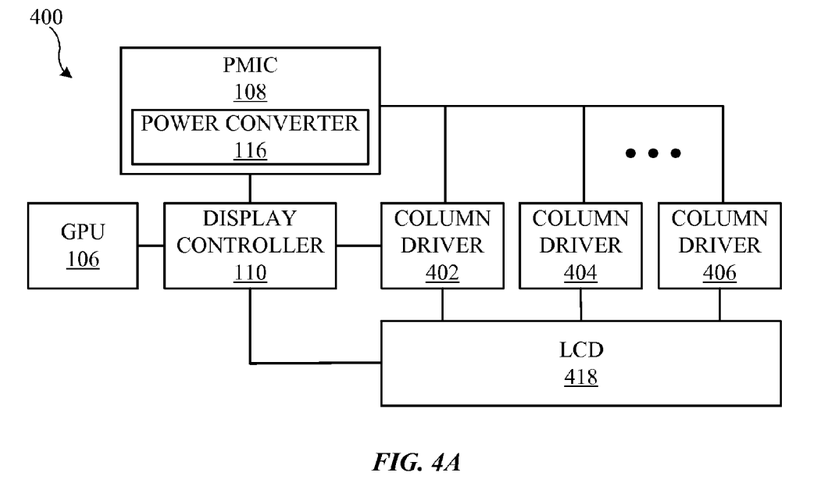
FIG. 4A illustrates a system diagram of an LCD being operated according to one or more of the power converter embodiments discussed herein.

FIG. 4A illustrates a system diagram 400 of an LCD 418 being operated according to one or more of the power converter embodiments discussed herein. The LCD 418 can be driven by one or more column drivers, which can correspond to the display drivers discussed herein. The LCD 418 can be driven by any number of column drivers, not limited to column drivers 402, 404, and 406, as indicated by the ellipsis (" . . . "). Each column driver can receive an output signal from the power converter 116 for powering each of the column drivers 402-406. The output signal can be dependent upon a configuration of the power converter, which can be based on a command signal from the display controller 110 as discussed herein. The command signal can change dynamically based on image data received by the display controller 110 from the GPU 106. In this way, the efficiency of the power converter 116 can be shifted according to the command signal by optimizing the arrangement of the power converter 116 based on the image data.

Figure 4B:
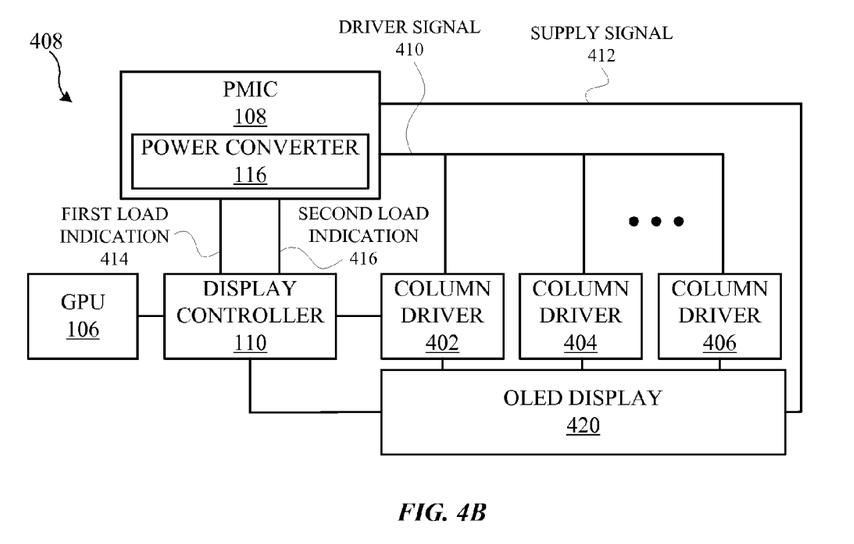
FIG. 4B illustrates a system diagram of an OLED display being operated according to one or more of the power converter embodiments discussed herein.

FIG. 4B illustrates a system diagram 408 of an OLED display 420 being operated according to one or more of the power converter embodiments discussed herein. The OLED display 420 can be driven by one or more column drivers, which can correspond to the display drivers discussed herein. The OLED display 420 can be driven by any number of column drivers, not limited to column drivers 402, 404, and 406, as indicated by the ellipsis (" . . . "). Each column driver can receive a driver signal 410 from the power converter 116 for powering each of the column drivers 402-406. Additionally, the OLED display 420 can receive a supply signal 412 from the power converter 116 for providing charge to one or more pixels of the OLED display 420. Each of the driver signal 410 and the supply signal 412 can be individually and dynamically adjusted based on image data received by the display controller 110 from the GPU 106. The display controller 110 can determine a load or change in load for one or more power converters 116 and generate a first load indication 414 and a second load indication 416 according to the load or change in load. Using the first load indication 414 and the second load indication 416, the PMIC 108 can reconfigure the power converter(s) 116 to most efficiently supply the driver signal 410 and the supply signal 412. In this way, the efficiency of the power converter(s) 116 can be shifted according to the first load indication 414 and the second load indication 416 by optimizing the arrangement of the power converter(s) 116 based on the image data.

Figure 5A:
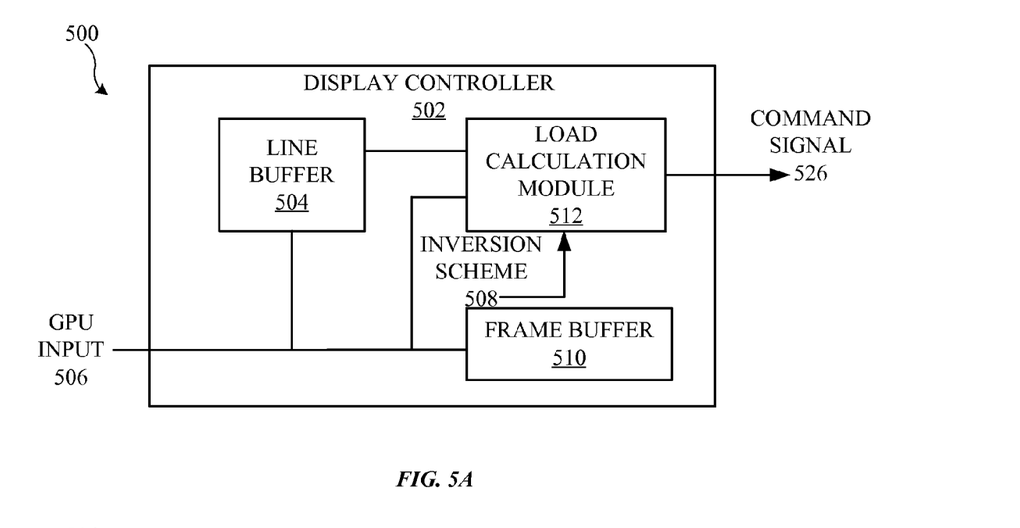
FIG. 5A illustrates a system diagram of an embodiment of a display controller for an LCD panel that can be connected to a power converter that reconfigures according to image data, as discussed herein.

FIG. 5A illustrates a system diagram 500 of an embodiment of a display controller 502 for an LCD panel that can be connected to a power converter that reconfigures according to image data, as discussed herein. The display controller 502 can receive a GPU input 506, which can be provided to a line buffer 504, a load calculation module 512, and a frame buffer 510. The frame buffer 510 can store the GPU input 506 and thereafter provide an output to the LCD panel based on the GPU input 506 so that the LCD panel can display images corresponding to the GPU input 506. The line buffer 504 can store a line of data from the GPU input for the load calculation module 512. In this way, the load calculation module 512 can perform load calculations based on a current line of data to be output by the LCD panel, and a previous line of data stored in the line buffer 504. For each frame of data provided in the GPU input 506, the load calculation module 512 can determine a load or power difference between each line of a frame, and thereafter sum up the differences. The sum of the differences can be used to generate a command signal 526 that is sent to the PMIC 108, as discussed herein. Because the type of inversion scheme being employed by the LCD panel can determine a polarity of one or more lines or pixels, the inversion scheme 508 can be input into the load calculation module 512. In this way, the differences in power or load between lines can be determined based on the polarity of each line. The command signal 526 can thereafter be based on such differences in power and load.

Figure 5B:
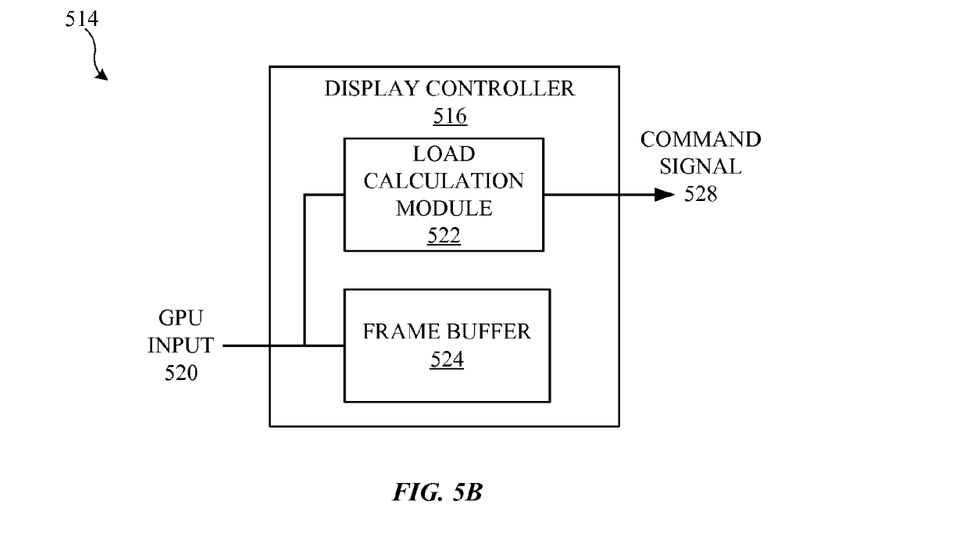
FIG. 5B illustrates system diagram of an embodiment of a display controller for an OLED display that can be connected to a power converter that reconfigures according to image data, as discussed herein.

FIG. 5B illustrates system diagram 514 of an embodiment of a display controller 516 for an OLED display that can be connected to a power converter that reconfigures according to image data, as discussed herein. The display controller 516 can receive a GPU input 520, which can be provided to a frame buffer 524 and a load calculation module 522. The frame buffer 524 can store the GPU input 520 and thereafter provide an output to the OLED display based on the GPU input 520 so that the OLED display can display images corresponding to the GPU input 520. The load calculation module 522 can be configured to calculate a load or change in load for the OLED display on a per frame basis. For example, the load calculation module 522 can calculate an average luminance, brightness, or gray level for a frame of the GPU input 520 and generate a command signal 528 for the PMIC 108 using a result of the calculation. Alternatively, the load calculation module 522 can calculate an average luminance, brightness, or gray level based on a frame of the GPU input 520 and compare it to that of a previous frame. Based on the comparison, the load calculation module 522 can generate a command signal 528 corresponding to a change in load of the OLED display.

Figure 6A:
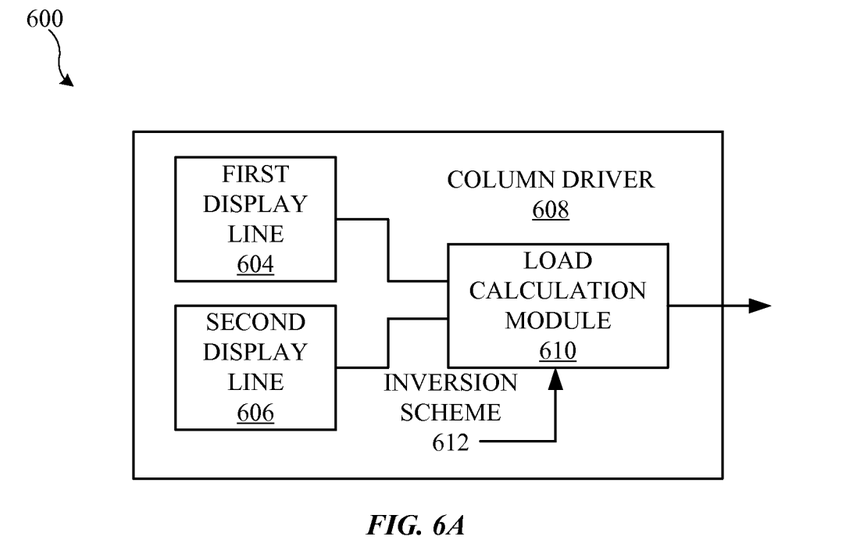
FIG. 6A illustrates a system diagram of an embodiment of a column driver that can perform load calculations and provide a command signal to a power converter based on the load calculations.

FIG. 6A illustrates a system diagram 600 of an embodiment of a column driver 608 that can perform load calculations and provide a command signal to a power converter based on the load calculations. The column driver 608 can include a load calculation module 610 that can provide a command signal to a PMIC 108 on a per line basis. The load calculation module 610 can determine image data that is being displayed at a first display line 604 and a second display line 606. Each of the first display line 604 and the second display line 606 can represent any line of a display panel that receives a current or voltage during operation in order to illuminate one or more pixels. Additionally, the second display line 606 can receive image data subsequent to the first display line 604 receiving image data. In this way, the load calculation module 610 can determine a load or change in load for each line based on image data corresponding to at least two adjacent lines. The load calculation module 610 can further calculate load or change in load based on an inversion scheme 612 that is being employed by the display panel, in order to more accurately calculate the load or change in load based on the polarity of each line or pixel for a specific inversion scheme. Upon calculating a load or change in load for each line, the load calculation module 610 can provide a command signal for each line of the display panel to the PMIC 108. The PMIC can, in response, rearrange a circuit configuration of a power converter of the PMIC 108 in order to optimize the power output of the power converter for the load or change in load.

Figure 6B:
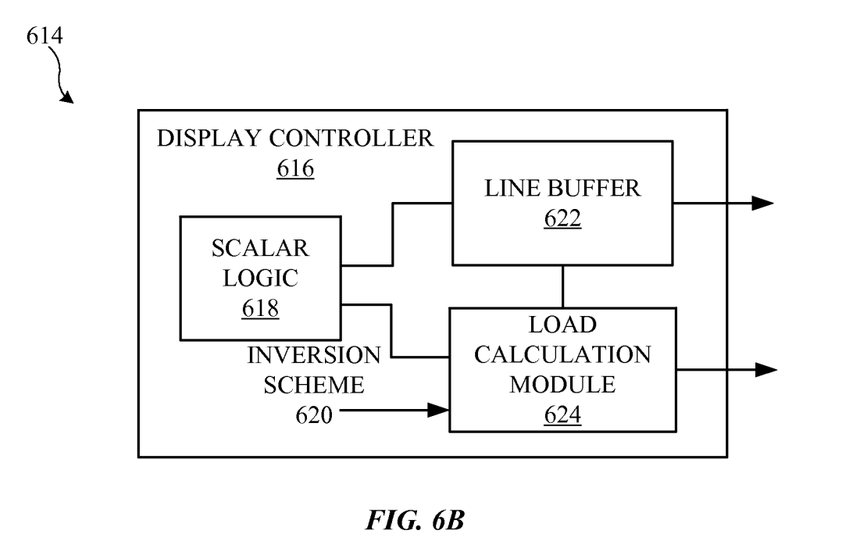
FIG. 6B illustrates a system diagram of a display controller that incorporates a scalar logic that can be used to perform load calculations based on image data being supplied to the display controller.

FIG. 6B illustrates a system diagram 614 of a display controller 616 that incorporates a scalar logic 618 that can be used to perform load calculations based on image data supplied to the display controller 616. The scalar logic 618 can determine whether to scale up or down luminance of pixels of a display panel. A load calculation module 624 of the display controller 616 can use an output from the scalar logic 618 to determine how the luminance, brightness, or gray level of the display panel is scaling for each pixel, line, or frame of data that is to be output by the display panel. For example, the scalar logic 618 can output data corresponding to amount of scaling for image data received by the display controller 616. The data can be stored by a line buffer 622 and thereafter provided to the load calculation module 624 for comparing with subsequent data provided by the scalar logic 618. By comparing the data received from the line buffer 622 and the scalar logic 618, the load calculation module 624 is able to generate a difference between loads of the display panel and dynamically provide a command signal to the PMIC 108 based on the difference in loads. The PMIC 108 can, in response, rearrange a power converter of the PMIC 108 in order to optimize the power output of the power converter for the load or change in load.

Figure 7:
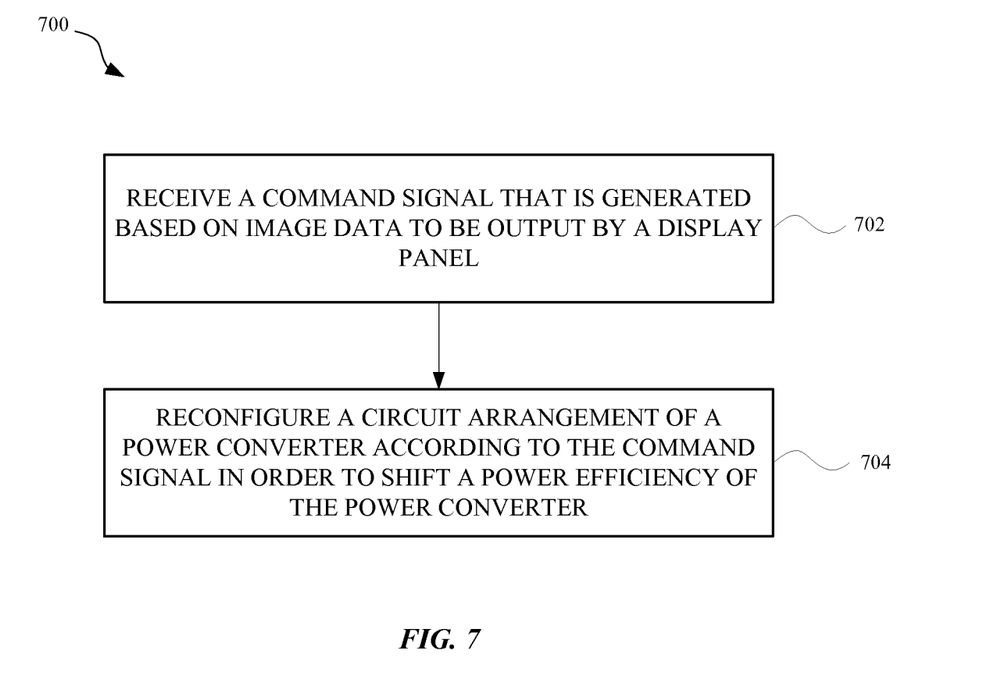
FIG. 7 illustrates a method for optimizing a power converter for a display panel based on image data to be output by the display panel.

FIG. 7 illustrates a method 700 for optimizing a power converter for a display panel based on image data to be output by the display panel. The method 700 can be performed by a PMIC, a display controller, a display panel, a computing device, or any other apparatus suitable for improving power efficiency of a display device. The method 700 can include a step 702 of receiving a command signal that is generated based on image data to be output by a display panel. The method 700 can further include a step 704 of reconfiguring a circuit arrangement of a power converter according to the command signal in order to shift a power efficiency of the power converter. It should be noted that method 700 can be modified according to any of the systems, methods, and apparatus discussed herein.

Figure 8:
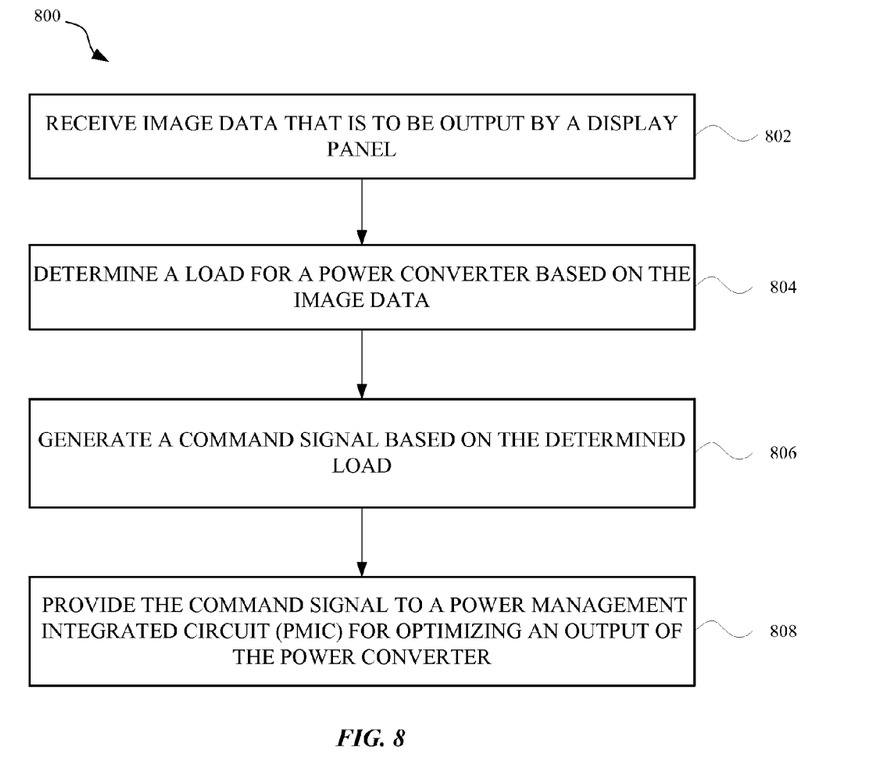
FIG. 8 illustrates a method for generating a command signal to optimize a power converter of a display panel based on image data to be output by the display panel.

FIG. 8 illustrates a method 800 for generating a command signal to optimize a power converter of a display panel based on image data to be output by the display panel. The method 800 can be performed by a display controller, PMIC, a display panel, a computing device, or any other apparatus suitable for improving power efficiency of a display device. The method 800 can include a step 802 of receiving image data that is to be output by a display panel. At step 804 of method 800, a load for a power converter is determined based on the image data. At step 806 of method 800, a command signal is generated based on the determined load. At step 808 of method 800, the command signal can be provided to a power management integrated circuit (PMIC) for optimizing an output of the power converter, which is connected to the PMIC. It should be noted that method 800 can be modified according to any of the systems, methods, and apparatus discussed herein.

Figure 9:
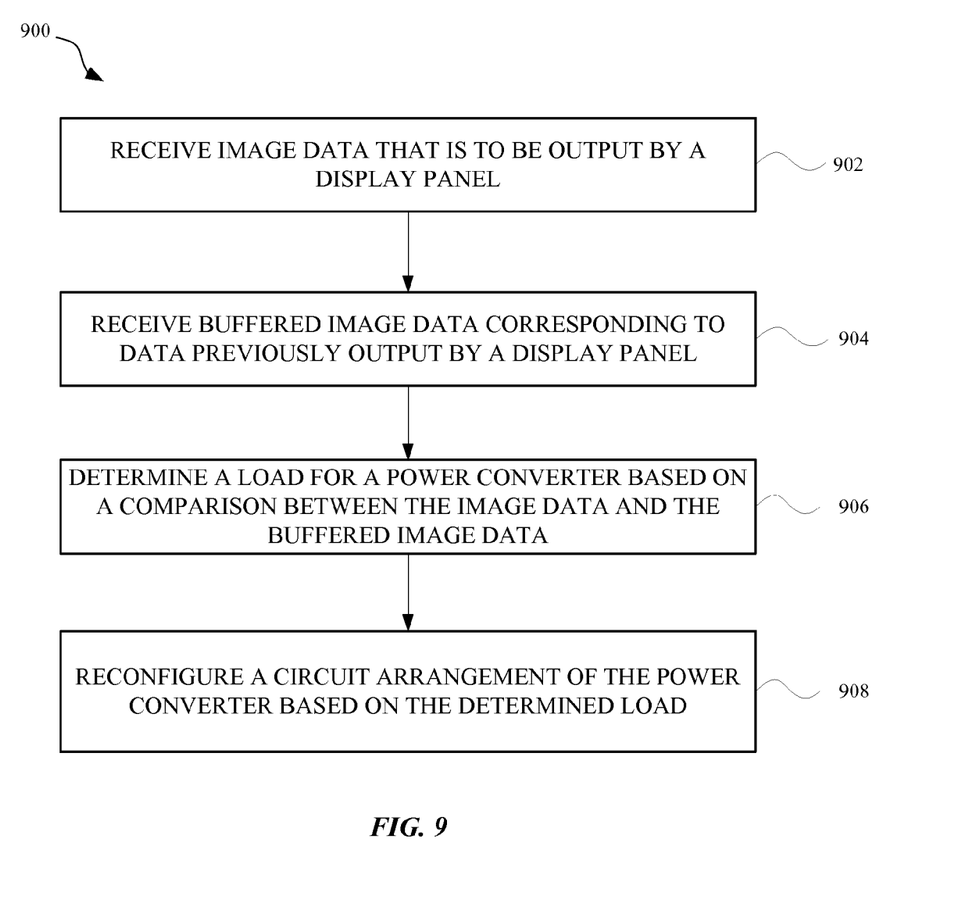
FIG. 9 illustrates a method for comparing image data to determine a load or change in load for a power converter in order to optimize the operation of the power converter.

FIG. 9 illustrates a method 900 for comparing image data to determine a load or change in load for a power converter in order to optimize the operation of the power converter. The method 900 can be performed by a display controller, PMIC, a display panel, a computing device, or any other apparatus suitable for improving power efficiency of a display device. The method 900 can include a step 902 of receiving image data that is to be output by a display panel. At step 904 of method 900, buffered image data corresponding to image data previously output by a display panel is received. At step 906 of method 900, a load for a power converter is determined based on a comparison between the image data and the buffered image data. At step 908 of method 900, a circuit arrangement of the power converter is reconfigured based on the determined load. It should be noted that method 900 can be modified according to any of the systems, methods, and apparatus discussed herein.

Figure 10:
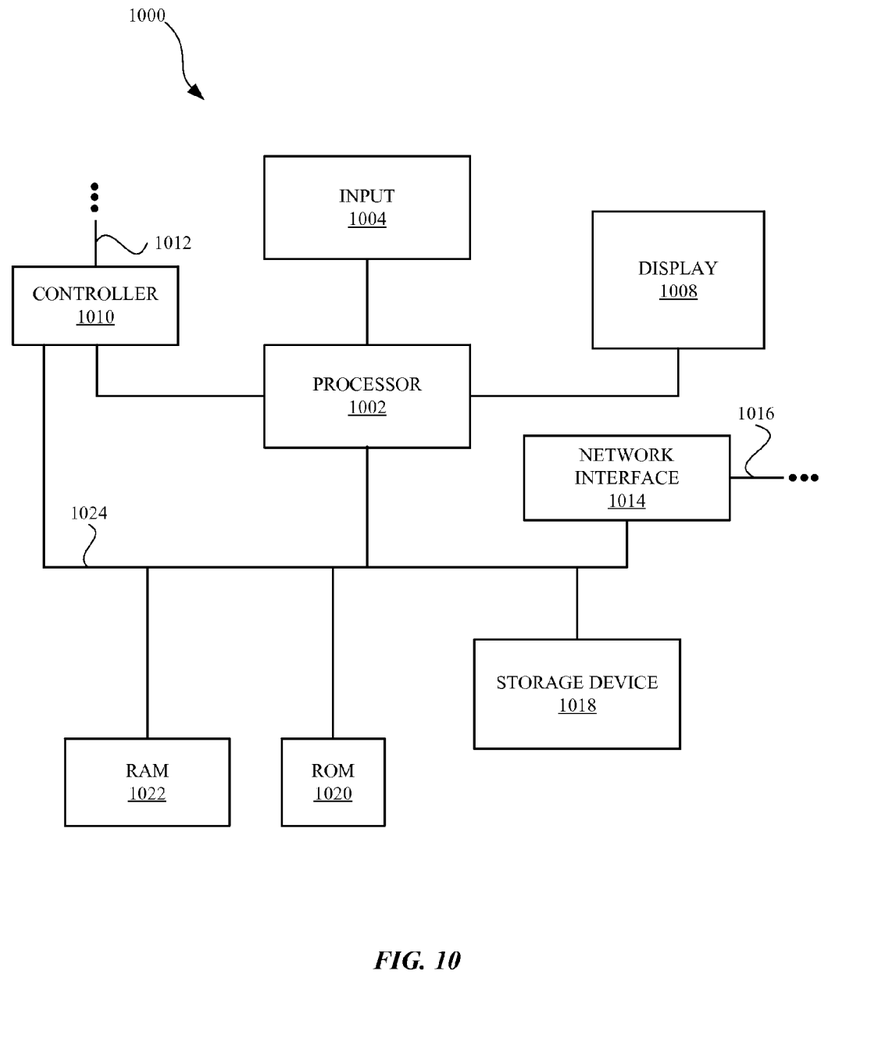
FIG. 10 is a block diagram of a computing device that can represent the components of the computing device and/or power converter discussed herein.

FIG. 10 is a block diagram of a computing device 1000 that can represent the components of the computing device 100, PMIC, and/or power converter discussed herein. It will be appreciated that the components, devices or elements illustrated in and described with respect to FIG. 10 may not be mandatory and thus some may be omitted in certain embodiments. The computing device 1000 can include a processor 1002 that represents a microprocessor, a coprocessor, circuitry and/or a controller 1010 for controlling the overall operation of computing device 1000. Although illustrated as a single processor, it can be appreciated that the processor 1002 can include a plurality of processors. The plurality of processors can be in operative communication with each other and can be collectively configured to perform one or more functionalities of the computing device 1000 as described herein. In some embodiments, the processor 1002 can be configured to execute instructions that can be stored at the computing device 1000 and/or that can be otherwise accessible to the processor 1002. As such, whether configured by hardware or by a combination of hardware and software, the processor 1002 can be capable of performing operations and actions in accordance with embodiments described herein. It should be noted that computing device 1000 can be modified according to any of the systems, methods, and apparatus discussed herein.

The computing device 1000 can also include user input device 1004 that allows a user of the computing device 1000 to interact with the computing device 1000. For example, user input device 1004 can take a variety of forms, such as a button, keypad, dial, touch screen, audio input interface, visual/image capture input interface, input in the form of sensor data, etc. Still further, the computing device 1000 can include a display 1008 (screen display) that can be controlled by processor 1002 to display information to a user. Controller 1010 can be used to interface with and control different equipment through equipment control bus 1012. The computing device 1000 can also include a network/bus interface 1014 that couples to data link 1016. Data link 1016 can allow the computing device 1000 to couple to a host computer or to accessory devices. The data link 1016 can be provided over a wired connection or a wireless connection. In the case of a wireless connection, network/bus interface 1014 can include a wireless transceiver.

The computing device 1000 can also include a storage device 1018, which can have a single disk or a plurality of disks (e.g., hard drives) and a storage management module that manages one or more partitions (also referred to herein as "logical volumes") within the storage device 1018. In some embodiments, the storage device 1018 can include flash memory, semiconductor (solid state) memory or the like. Still further, the computing device 1000 can include Read-Only Memory (ROM) 1020 and Random Access Memory (RAM) 1022. The ROM 1020 can store programs, code, instructions, utilities or processes to be executed in a non-volatile manner. The RAM 1022 can provide volatile data storage, and store instructions related to components of the storage management module that are configured to carry out the various techniques described herein. The computing device 1000 can further include data bus 1024. Data bus 1024 can facilitate data and signal transfer between at least processor 1002, controller 1010, network/bus interface 1014, storage device 1018, ROM 1020, and RAM 1022.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for operating a power management device of a display device to improve power efficiency of the display device, the power management device having different switch arrangements associated with different power efficiency curves of the power management device, each curve having a peak power efficiency relative to a load value, the method comprising:

by the power management device:
receiving a command signal associated with an expected load difference of the power management device, wherein the expected load difference is based in part on a comparison of an expected load associated with image data to be output by a display panel with a current load associated with previous image data; and
reconfiguring the switch arrangement of the power management device according to the expected load difference in order to shift the peak power efficiency of the power management device based on the image data,
wherein the power management device comprises a switched capacitor regulator, having a plurality of charge modules connected in parallel, each charge module comprises a first set of two switches, a second set of two switches, and a capacitor having a first terminal connected between the two switches of the first set of switches and a second terminal connected between the two switches of the second set of switches, and wherein reconfiguring the switch arrangement of the power management device includes activating or deactivating one or more of the charge modules.

2. The method of claim 1, wherein the image data corresponds to a frame of image data or one or more lines of image data, and the expected load difference is based on an average brightness of the display panel when the display panel is outputting the image data.

3. The method of claim 2, wherein reconfiguring the switch arrangement includes increasing or decreasing a capacitance of the power management device.

4. The method of claim 1, further comprising:
providing an output to a display driver according to the switch arrangement, wherein reconfiguring the switch arrangement increases or decreases a voltage or current output to the display driver.

5. The method of claim 1, wherein the peak power efficiency of the power management device is shifted prior to the display panel outputting the image data.

6. A display controller coupled to a power converter having different switch arrangements associated with different power efficiency curves, each having a peak power efficiency relative to a load value, comprising:
an input configured to receive image data for display at a display panel, wherein the display controller is configured to perform a comparison of a current bad associated with previous image data and an expected bad associated with the received image data to determine a bad difference based on the comparison; and an output configured to send a command signal based on the load difference to the power converter to cause the power converter to (i) reconfigure the switch arrangement of the power converter to shift the peak power efficiency of the power converter and (ii) provide power to the display panel based on the load difference, wherein the power converter comprises a switched capacitor regulator, having a plurality of charge modules connected in parallel, each charge module comprises a first set of two switches, a second set of two switches, and a capacitor having a first terminal connected between the two switches of the first set of switches and a second terminal connected between the two switches of the second set of switches, and wherein the power converter is configured to reconfigure the switch arrangement of the power converter includes activating or deactivating one or more of the charge modules.

7. The display controller of claim 6, wherein the display panel is a liquid crystal display (LCD) or an organic light emitting diode (OLED) display.

8. The display controller of claim 6, further comprising:
a buffer configured to periodically store the previous image data for comparison with the received image data, wherein the previous image data corresponds to a frame of image data or an individual line of image data.

9. The display controller of claim 8, wherein the display controller is further configured to calculate a total brightness value associated with displaying the received image data at the display panel and use the total brightness value to determine the expected load.

10. The display controller of claim 6, wherein the display controller is further configured to (i) calculate a sum of the load difference and a previously determined load difference, and (ii) generate the command signal based on the sum.

11. A computing device, comprising:
a display panel configured to output image data provided by a graphics processor of the computing device;
a display controller configured to generate a command signal based on the image data, wherein the command signal corresponds to a load difference between an expected load associated with the image data and a current load associated with previously output image data; and
a power converter configured to provide power to the display panel at least based on the command signal, the power converter having different switch arrangements associated with different power efficiency curves of the power converter, each power efficiency curve having a peak power efficiency relative to a load value, wherein the power converter is adapted to dynamically adjusting the power efficiency curve based on the load difference by changing the switch arrangement;

wherein the power converter comprises a switched capacitor regulator, having a plurality of charge modules connected in parallel, each charge module comprises a first set of two switches, a second set of two switches, and a capacitor having a first terminal connected between the two switches of the first set of switches and a second terminal connected between the two switches of the second set of switches, and wherein the power converter is adapted to changing the switch arrangement by activating or deactivating one or more of the charge modules.

12. The computing device of claim 11, further comprising:
a buffer configured to store the previously output image data.

13. The computing device of claim 11, wherein each set of switches of each charge module includes two transistors that are each connected to the capacitor between the two sets of switches, and the command signal is configured to cause the power converter to activate or deactivate at least one transistor based on the image data.

14. The computing device of claim 11, wherein the display panel is an organic light emitting diode (OLED) display panel and the display controller is configured to determine a gray level associated with the image data and the previously output image data.

15. The computing device of claim 11, wherein the display controller includes or is connected to a scalar, wherein the scalar is configured to scale a luminance value associated with the image data based on the load difference between the image data and the previously output image data.

16. The computing device of claim 11, wherein dynamically adjusting the power efficiency curve includes adjusting a resistance and capacitance of the power converter according to the image data.

17. The computing device of claim 11, wherein the image data corresponds to frame data or line data, and the power efficiency curve is periodically adjusted based on a frame rate of the display panel.

* * * * *

UNITED STATES PATENT AND TRADEMARK OFFICE
CERTIFICATE OF CORRECTION

PATENT NO.        : 9,824,615 B2                                           Page 1 of 1
APPLICATION NO.   : 14/732764
DATED             : November 21, 2017
INVENTOR(S)       : Chaohao Wang et al.

It is certified that error appears in the above-identified patent and that said Letters Patent is hereby corrected as shown below:

In the Claims

In Column 12, Line 64:
Replace "to perform a comparison of a current bad", with --to perform a comparison of a current load--.

In Column 12, Line 65:
Replace "with previous image data and an expected bad", with --with previous image data and an expected load--.

In Column 12, Line 67:
Replace "bad difference based on the comparison; and", with --load difference based on the comparison; and--.

Signed and Sealed this
Thirteenth Day of March, 2018

Andrei Iancu
*Director of the United States Patent and Trademark Office*